Figure 1:
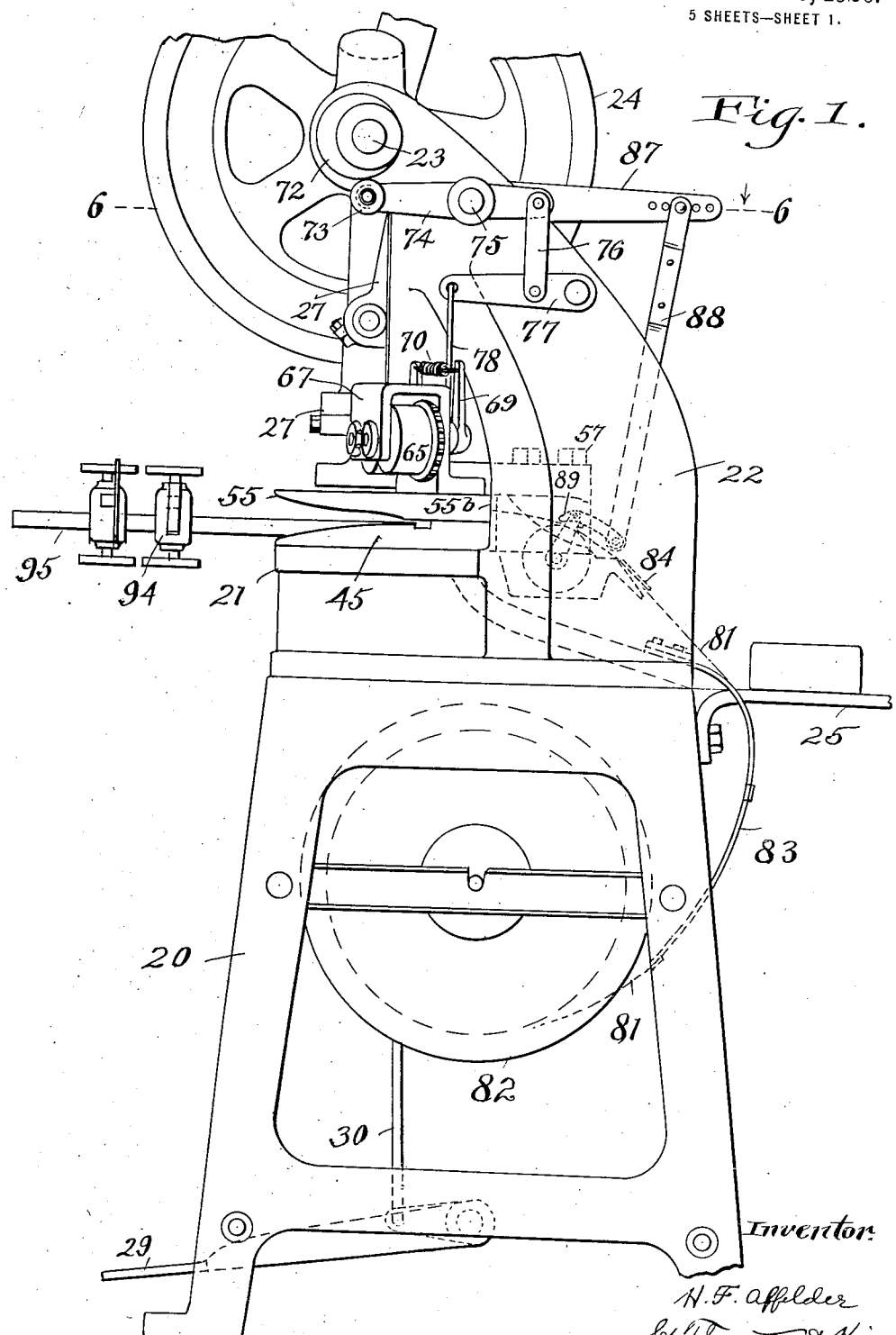

H. F. AFFELDER.
ENVELOP CLASPING MACHINE.
APPLICATION FILED MAY 11, 1917.

1,328,472.

Patented Jan. 20, 1920.
5 SHEETS—SHEET 1.

Inventor
H. F. Affelder
by Thurston & Kwis
Attys.

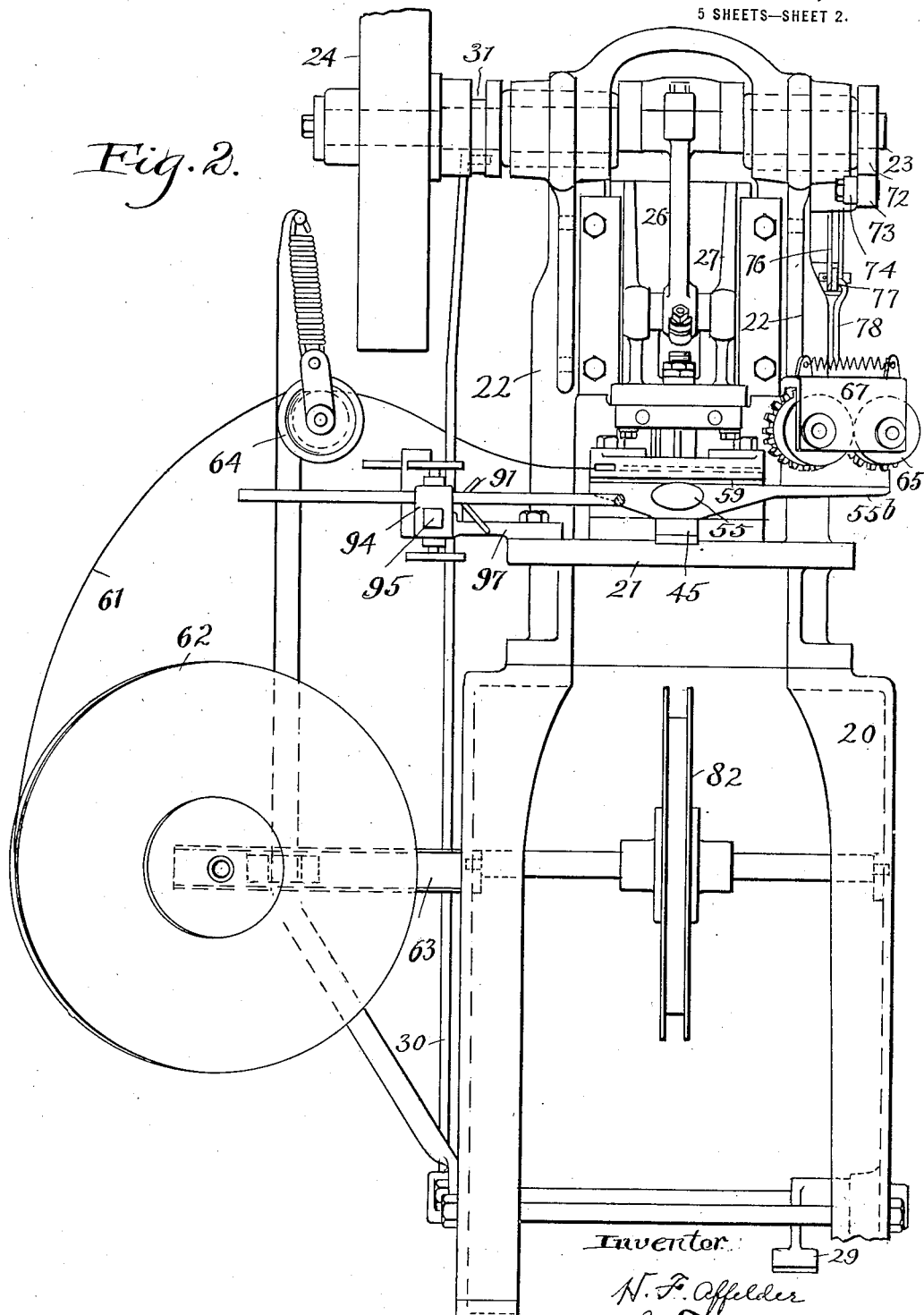

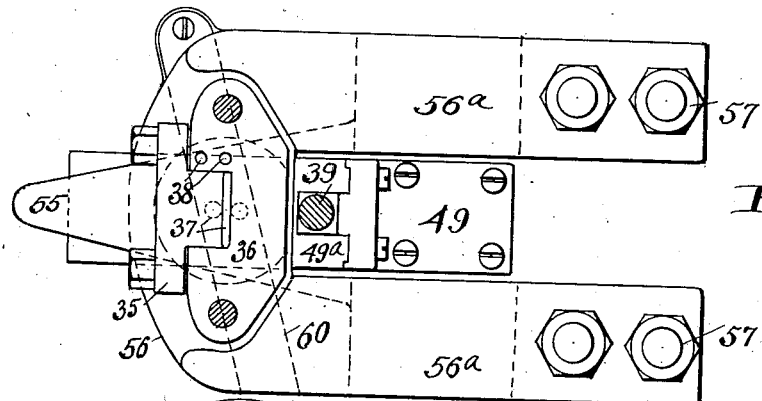

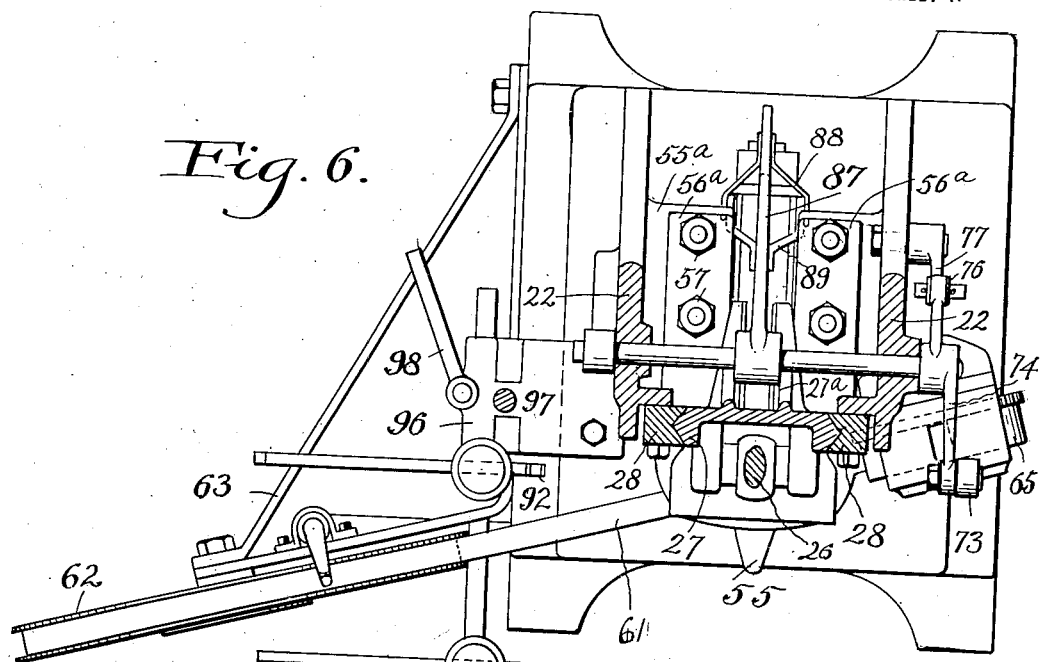
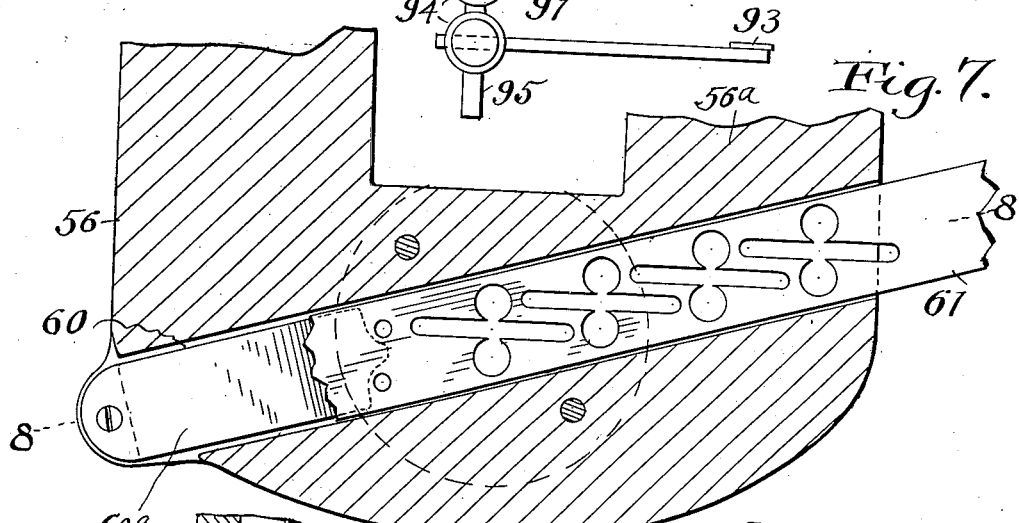

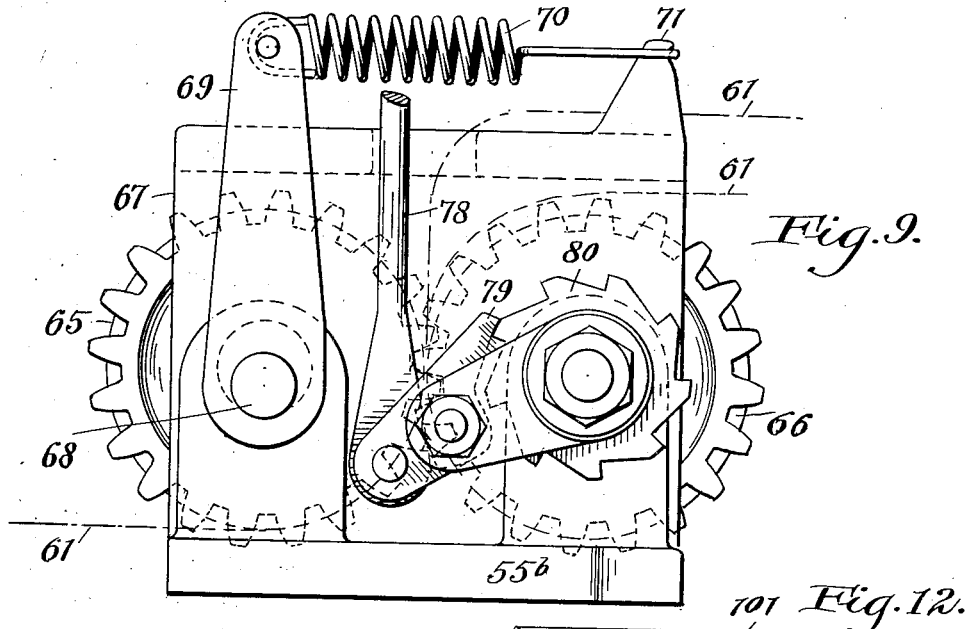
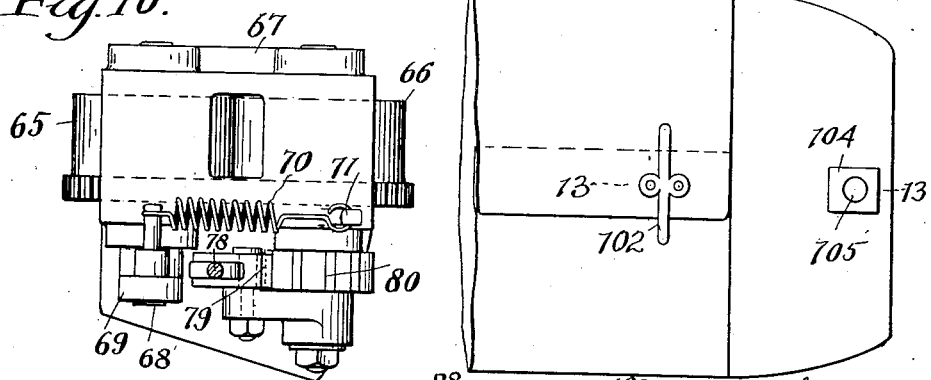
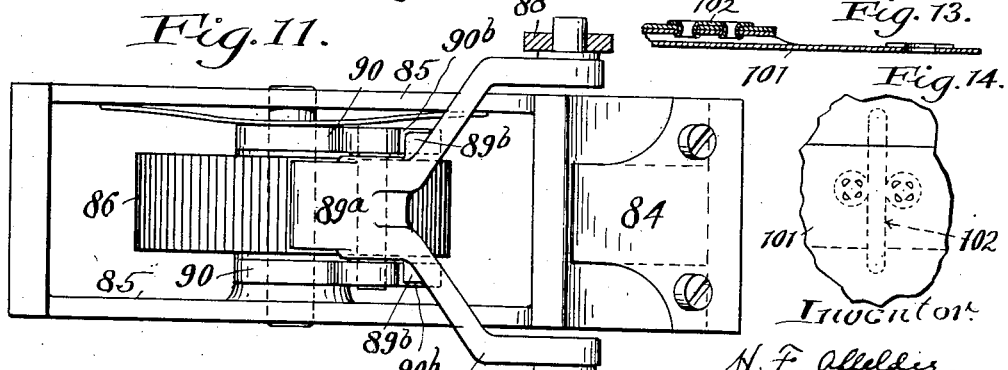

UNITED STATES PATENT OFFICE.

HARRY F. AFFELDER, OF CLEVELAND, OHIO.

ENVELOP-CLASPING MACHINE.

1,328,472.  Specification of Letters Patent.  Patented Jan. 20, 1920.

Application filed May 11, 1917. Serial No. 167,879.

*To all whom it may concern:*

Be it known that I, HARRY F. AFFELDER, a citizen of the United States, residing at Cleveland, in the county of Cuyahoga and State of Ohio, have invented a certain new and useful Improvement in Envelop-Clasping Machines, of which the following is a full, clear, and exact description.

This invention relates to an envelop clasping machine of the type wherein metal clasps are punched from a strip of metal and fastened to envelops while at the same time, reinforcing tabs are cut from a strip of paper or equivalent material and attached to the flaps of the envelop, the reinforcing tab and flap being also punched so as to provide an opening through which portions of the clasp can be extended to fasten the flap down on the body of the envelop.

The object of the invention is to provide a machine which in the same operation forms and applies the clasp to the body of the envelop and forms and applies the reinforcing tab to the flap of the envelop.

Further, the invention aims to provide a machine which will perform these operations on the successively supplied envelops rapidly and effectively, and which is strong and durable, and wherein the parts are readily accessible in case repairs become necessary, and adjustable in the event it is desired to clasp envelops of different sizes, special provision being made for varying the distance between the point of attachment of the clasp and point of attachment of the reinforcing tab so as to adapt the machine for envelops of various sizes and shapes.

In general the invention aims to provide a machine of this character which is efficient and which will very materially reduce the cost of making envelops of this type.

The invention may be briefly summarized as consisting in certain novel combinations and arrangements of parts and details of construction as will be fully described in the specification and set forth in the accompanying claims.

In the accompanying sheets of drawings which show an embodiment of my invention which operates with high efficiency, Figure 1 is a side view of the machine; Fig. 2 is a front view of the same; Fig. 3 is an enlarged vertical sectional view through the center of the machine showing particularly the punches, dies, etc., which form and apply both the clasp and the reinforcing tab and certain parts associated therewith; Fig. 4 is a transverse horizontal sectional view substantially along the line 4—4 of Fig. 3 looking downward or in the direction indicated by the arrows; Fig. 5 is a sectional view substantially along the irregular line 5—5 of Fig. 3; Fig. 6 is a sectional view substantially along the line 6—6 of Fig 1 looking downward or in the direction indicated by the arrows; Fig. 7 is an enlarged fragmentary sectional view taken substantially along the line 7—7 of Fig. 3, looking downward or in the direction indicated by the arrows, this view showing particularly the line of travel of the metal strip from which the clasps are punched; Fig. 8 is a sectional view substantially along the line 8—8 of Fig. 7 this view showing in addition the clasp forming punches and the lower part of the punch holder; Fig. 9 is an enlarged side view of the metal strip feeding mechanism; Fig. 10 is a top plan view of the same on a reduced scale; Fig. 11 is a top plan view of the means for wetting the lower side of the gummed strip from which the tabs are formed and for feeding the strip; Fig. 12 is a plan view of a portion of an envelop showing the clasp and reinforcing tab applied with this machine; Fig. 13 is a sectional view substantially along the line 13—13 of Fig. 12; and Fig. 14 is an inside view of the portion of the envelop to which the clasp is attached.

The frame or body of the machine includes suitable supporting legs 20 to which is secured a housing which includes a horizontal bed 21 and a pair of upstanding arms or standards 22. At the top of these standards there is journaled a crank-shaft 23 which may be driven in any suitable manner. As here shown, this crank-shaft is provided with a fly-wheel 24 which is normally loose on the crank-shaft and is designed to be rotated by a belt driven by a motor which may be supported in any suitable position, such for example as on brackets, a portion of which are shown at 25 in Fig. 1. This crank-shaft is connected by a connecting rod 26 to a vertical reciprocating ram 27 which is guided in V-shaped ways 28 secured to the inner sides or faces of the arms or standards 22 (see particularly Fig. 6). This ram carries the punches for forming and applying the clasp and the movable shear and punching member for forming and applying the reinforcing tab in one complete revolution of the crank-shaft; in consequence, in one complete cycle of movement of the ram which includes a downward and upward stroke, a clasp is formed and applied to an envelop, a tab is formed and applied to the flap, and the metal strip from which the clasp is punched and the paper strip from which the tab is cut are fed forwardly appropriate amounts for the next cycle of movement during which another envelop is clasped and reinforced at the flap.

The crank-shaft may, as is general with presses of different types, be allowed to run continuously, or it may make separate and intermittent revolutions timed by the operator through clutch and pedal mechanism. It will be observed that at the lower part of the machine there is a foot pedal 29 which is connected by a rod 30 which extends from the lower part of the machine upwardly to the top thereof, and operates a suitable clutch designated by the reference character 31. The clutch is not shown in detail as it may have any appropriate form, it being understood that if the clutch pedal is depressed and then released, the crank-shaft will be clutched to the fly-wheel and after making one complete revolution will be released. If, on the other hand, the clutch pedal is continuously depressed, the crank-shaft will continue to rotate and the ram will continue to make its downward and upward strokes until the clutch pedal is released.

Secured to the lower front side of the ram 27 are two punch holding members 35, 36, (see particularly Figs. 3 and 4) which carry a downwardly projecting main punch 37 for punching out clasps in the shape shown most clearly in Fig. 12, these clasps having two laterally extending wings which are adapted to be bent upwardly and projected through an opening in the flap of the envelop and having also two substantially circular middle portions which are designed to be riveted to the body of the envelop. In addition these punch holders carry two punches 38, 38, which are in advance of the punch 37 and punch holes in the portions of the strip which form the middle parts of the clasp and bend the metal downwardly, forming prongs by which the clasps are fastened or riveted to the envelops. The two punches 38 are so located with reference to the punch 37 that while the latter is punching out one clasp, the former are punching the holes for the next succeeding clasp.
At the rear of the punch holding members and punches the ram 27 carries a vertical shear and punch member 39 having a rectangular lower portion 39ᵃ which acts as a shear to cut off tabs from the paper strip to be referred to presently, and at its lower end has a punch 39ᵇ which punches a hole in the flap of the envelop and in the tab which is applied thereto. This punch and shearing member 39 is adjustably secured by plates 40 and a bolt 41 between a pair of arms 27ᵃ projecting rearwardly from the lower part of the ram.

The dies which coöperate with the punches 37, 38, and the combined punch and shearing member 39 will be referred to presently.

Secured to the lower horizontal bed 21 of the housing is a base 45 constituting one of the two members which support the envelop while it is being clasped. This base 45 is secured to the bed 21 of the housing by a bolt 46 extending through a slot 47 of the housing so that the base 45 with other parts carried by it may be adjusted forwardly and rearwardly in the manner hereinafter explained. To the upper rear part of the base 45 is secured a shear member 48 which coöperates with the shear and punch member 39 to shear the paper strip to form the reinforcing tabs.

To the top of this shear member 48 is secured a bracket 49 which with a front cap plate 49ᵃ secured thereto (see Figs. 3 and 4) constitute a vertical guide or slideway for the punch and shear member 39. Between the shear plate 48 and the bracket 49 there is a horizontal slot 50 to accommodate the gummed strip of paper from which the tabs are cut, the gummed strip passing over two rather sharp upstanding ribs of a metal guide strip 51 in the base of the slot (see particularly Figs. 3 and 5). Above the base 45 and in front of the combined shear and punch member 39 is a horn 55 which constitutes the other of the two members which support the envelop during the clasping operation. As will be subsequently explained, the envelop is slipped onto the horn 55 with the flap of the envelop underneath and projecting into the V-shaped slot between the horn 55 and base 45 so as to rest on the rear part of the latter. This horn has rearwardly extending parallel arms 55ᵃ which extend rearwardly on opposite sides of the bracket 49 and of the punch and shear member 39, and are secured to the rear part of the housing bed 21. Just above the horn 55 is a die holder 56 which likewise has rearwardly extending arms 56ᵃ which embrace the bracket 49 and the punch and shear member 39 and rest on the arms 55ᵃ of the horn, the die holder and horn being fastened to the bed 21 of the housing by bolts 57 (see Figs. 3 and 4).

Secured to the lower front side of the die holder is a die plate 58 containing a die opening adapted to receive the clasp punching die 37, which opening of course conforms to the shape of the latter, and two circular openings which receive the punches 38 for punching the two holes in the metal strip and to form the prongs by which the clasp is secured to the envelop as before stated. Between the die plate 58 and the horn 55 is a horizontal slot 59 which receives the upper portion of the envelop to which the clasp is to be attached.

Extending through the lower side of the die holder 56 is a slot 60 which extends in a horizontal direction through the die holder but diagonally with respect to the central vertical plane of the machine and with respect to the axes of the envelop supports 45 and 55, and hence of the envelop being clasped. This diagonal disposition of the slot is clearly shown in Fig. 7, and the purpose of the same will be described presently. The slot receives the metal strip 61 from which the clasps are punched, this strip being supplied from a spool or reel 62 supported by brackets 63. The strip passes from the reel over a yieldingly supported roller 64 (see particularly Fig. 2), and then it passes through the slot 60 in the die holder. In passing through the latter under the dies, clasps are punched therefrom, and then the remainder of the strip not used in forming the clasps passes out from the die holder between a pair of feeding rolls 65, 66, which are geared together so as to rotate in opposite directions, and are supported at one side of the machine in a housing 67, the housing in turn being secured to an arm 55$^b$ extending laterally from one side of the horn 55. The strip passes under one of the rolls up between the rolls and over the second roll in the manner shown by dotted lines in Fig. 9, the intermittent rolling action of these rolls pulling the strip a predetermined amount at each operation of the machine. In order that the rolls may have the proper gripping and feeding action on the strip, one of the rolls is supported on an eccentric stud 68 to which is pinned an upstanding arm 69, the upper end of which is connected by a spiral spring 70 to a lug 71 on the housing 67 (see Fig. 9). The action of this spring is to turn the eccentric stud and thus move the roll 65 into engagement with the periphery of the roll 66. In this manner sufficient gripping action is obtained between the rolls and the strip to positively feed or pull the strip a definite or predetermined amount at each revolution of the rolls. These rolls are intermittently rotated in the following manner:—

The crank-shaft 23 is provided at one end with a cam 72, the periphery of which is engaged by a roller 73 at the forward end of a lever 74 secured to a rock-shaft 75 extending between the standards 22 (see Figs. 1 and 6). The lever 74 projects rearwardly beyond the rock-shaft and at its rear end is connected by a link 76 to a second lever 77 pivotally supported on one of the standards 22. The forward end of this lever 77 is connected by a rod 78 to a pawl 79 (see Fig. 9) coöperating with ratchet teeth of a ratchet disk 80 mounted on the stud supporting the feed roll 66. When the rod 78 is elevated, the pawl 79 turns the ratchet 80 a sufficient distance to feed the metal strip the desired amount, and when the rod is lowered, the pawl leaves the tooth which it previously engaged and is moved to a position to engage the next succeeding tooth of the ratchet, and on the next forward movement of the rod engages said tooth and again turns the ratchet the required distance. Thus the rolls are intermittently rotated by the pawl and ratchet mechanism operated through the links and levers just described.

The gummed paper strip 81 from which the reinforcing tabs are cut and applied to the flaps of the envelops is supplied from a reel or spool 82 supported under the housing of the machine between the legs 20. This strip after leaving the spool 82 passes around or lengthwise through a curved guide 83, and then under a yieldable friction plate 84 (see Figs. 1, 3 and 11) the latter being supported at one edge of a receptacle 85 which is secured on the rear end of the base 45 and rear end of the bracket 49, as clearly shown in Fig. 3. This receptacle which is below and at the rear end of the slot 50 previously referred to between the bracket 49 and shear plate 48 of the machine, contains a combined wetting and feeding roller 86 over the periphery of which the gummed strip passes after passing under the yieldable plate 84. The strip then passes into the slot 50 just referred to, over the shear plate 48, and as it passes beyond the slot it is sheared into short sections which constitute the reinforcing tabs.

The receptacle 85 is provided with a suitable quantity of water in which the lower part of the combined wetting and paper feeding roll 86 extends. This roll 86 is turned intermittently to feed the paper an appropriate amount at each operation of the machine and also to constantly bring a wet portion of the roll into contact with the lower gummed side of the paper. The intermittent feeding of this roll is accomplished as follows: The rock-shaft 75 which is near the upper part of the machine and which is rocked by the cam 72, has secured to the middle thereof a lever 87 having at its rear end a series of openings, into a selected opening of which is pinned the upper forked end of a rod 88 which extends downwardly to a point just above the rear part of the receptacle 85. The lower end of this rod which is forked, is pivotally connected to the forked end of a pawl 89, (see particularly Figs. 3 and 11) which pawl is pivoted to a pair of links 90 which are journaled on the axle or stud on which the roller 86 is mounted. At its forward end the pawl 89 has a nose 89ª so disposed that when the rod 88 is moved upwardly by the upward rocking movement of the lever 87 on the rockshaft, the pawl 89 is rocked about its pivotal axis of connection with the links 90 until the nose engages the paper extending over the periphery of the roll 86, and at the same time the pawl 89 and the links 90 are swung forwardly. The surface of the roll 86 is knurled or roughened so that by this movement of the pawl the roll is given a predetermined rotary movement and the paper is fed forward a predetermined amount which is just sufficient to equal the length of the tab which is to be cut off of the forward end of the strip. The pawl 89 and the links 90 are provided with shoulders 89ᵇ and 90ᵇ, which shoulders are engaged when the rod 88 moves downwardly so that on the downward movement of this rod the nose of the pawl will be moved out of engagement with the paper until the shoulders engage, and then the pawl and links will be swung backward and downward as a unit. This brings the pawl and the links to the proper positions for the next upward and forward feeding movement.

In addition to the parts or mechanism heretofore described, the machine has certain gages against which the envelop is placed so that the clasp and tab will be applied at the desired points. These gages include preferably two V-shaped side gages 91 and 92, against which the one longitudinal or side edge of the envelope is adapted to be placed, and an end gage 93, against which the end of the envelop is adapted to be placed. These gages are all adjustable forwardly, rearwardly and laterally so as to adapt them for envelops of different sizes and shapes. To permit these adjustments, the gages are formed on the inner ends of rods which pass through blocks 94 (see Fig. 2) so that they may be moved lengthwise through the blocks, which blocks are mounted for movement forwardly and rearwardly on a gage supporting arm 95 (see Fig. 6) adjustably secured in a boss 96 at the outer end of a bracket 97 which is secured to the bed of the housing (see Fig. 2). The arm 95 is adapted to be locked in the bracket, or released for adjustment by a locking member 98 (see Fig. 6). The construction, however, of these gages is not material to the invention, and they may be otherwise formed and arranged if desired. Hence they need not be shown or described in a more detailed manner.

The machine is operated in the following manner: An envelop is slipped onto the horn 55, with the flap downward and extending into the space or slot between the horn 55 and base 45, and projecting back beyond the forward end of the shear plate 48 so that the forward part of the body of the envelop will be beneath the dies and punches which form and apply the clasp, and a portion of the flap will be beneath the punch and shear member 39 which cuts off the tab from the gummed paper strip and applies the tab. The envelop will be positioned quickly and easily by means of the gages just described. The operator then presses down on the foot pedal, whereupon the machine goes through its cycle of movement. In doing this the ram is lowered and then raised, and if the operator previously removed his foot from the foot pedal the ram will come to a stop in its uppermost position. As the ram passes downwardly the punches 38 punch two holes in the metal strip just in front of the clasp forming punch 37, and the latter punches out the clasp, this clasp having the holes and prongs which in the preceding operation were punched by the punches 38. The punch 37 carries the clasp downwardly and attaches it to the body of the envelop with the coöperation of a small die 100, which is just beneath the punch 37, and is preferably provided with two upstanding points 100ª which are directly below the two punched openings in the clasp. By the action of the punch 37 and the die 100 the clasp is virtually riveted to the envelop as illustrated in Figs. 13 and 14. In Figs. 12, 13 and 14 the envelop is designated by the reference character 101 and the clasp is designated 102. It will be observed from Figs. 7 and 8 that the forward end of the slot 60 through which the strip 61 is fed, is provided with a yieldable spring tongue 60ª over which the strip slides. This spring tongue is secured at its outer end to the base of the slot and its free end is normally elevated and is adjacent the holes of the die plate which receive the punches 38. The purpose of this tongue is to elevate the strip 61 after the punching operation so that the prongs on the lower side of the strip 61 will clear such openings and permit the free feeding of the strip.

At the same time that the clasp is formed in the manner above described, the descending punch and shear member 39 which moves, of course, synchronously with the punches 37 and 38, shears off the forward end of the gummed paper strip 81, this shearing being done by the lower end of member 39 with the coöperation of the front end of the shear plate 48. The tab which is thus cut from the paper strip and which is wet on its lower gummed side, is then carried downward by member 39 and applied to the flap of the envelope. Simultaneously the round punch 39ᵇ at the lower end of the punch and shear member 39 with the coöperation of a die 103 supported by the base 45, directly beneath the member 39, punches a round hole in the tab and also in the flap of the envelop. In Fig. 12 the tab is designated 104 and the opening just referred to is designated 105. This completes the clasp forming and applying and the tab forming and applying, and the envelop will then be removed by the operator and the operation will be repeated on another envelop.

In the cycle of movement or cycle of operations of the machine which takes place during one complete revolution of the crankshaft, the metal strip 61 and the gummed paper strip 81 are moved forwardly predetermined distances in the manner previously described, the strip 61 being pulled forwardly by the action of the rolls 65 and 66 and the gummed strip being pushed through the slot 50 by the action of the pawl 89 and roller 86. While these feeding operations take place in the cycle of movement, it is immaterial at what point of the cycle they take place. I prefer that the metal strip and the gummed paper strip be fed forwardly the proper amounts during the down stroke of the ram. This may, however, take place on the up stroke of the ram, or the feeding movements may be divided and half the feed given to the strips on the up stroke of the ram and the other half on the succeeding down stroke. The results, however, are precisely the same at whatever point in the cycle of operations the feeding movements take place, the particular time of feeding being largely a matter of choice.

If it is desired to clasp envelops of different sizes with the same distance between the point of attachment of the clasp and the point of attachment of the tab it will only be necessary to adjust the gages. If, however, the distance between the clasp and the tab is to be varied (it may be here stated that this distance generally varies with different sizes of envelops) this can be readily accomplished by loosening the bolt 46 which fastens the base 45 to the bed 21 of the housing, and by loosening the bolt 41 which clamps the plates 40 between the rearwardly extending arms at the lower end of the ram. When these bolts are loosened the base 45, shear plate 48, bracket 49 and cap which is associated therewith to form the guide for the shear and punch member 39, also said member 39, the securing plates 40, the receptacle 85 and the parts immediately associated therewith may be moved forwardly or rearwardly as a unit, and then the parts can be fastened or tightened in the adjusted position by again tightening the bolts 41 and 46.

This machine can be operated with great rapidity and at the same time the clasping and tabbing is done in a very effective manner. Additionally the machine has the advantage described in the paragraph immediately preceding this, as to adjustability to adapt the machine for various sizes of envelops, the change to accomplish this being made easily and quickly. Furthermore the design of the machine and the manner in which the parts are assembled and secured together allows any part which may be broken or worn, or which needs adjustment to be easily removed or adjusted. Additionally the machine has important advantages over prior machines used for clasping envelops because the clasping and tab applying are accomplished in one machine or in one operation, whereas as far as I am aware, these operations were heretofore done in separate machines. The present machine is also more efficient than the prior machines as to the amount of metal required to form the clasps. As far as I am aware, heretofore the clasps were punched out of the strip with the longitudinal axis of the clasp extending in the direction of the length of the strip. However, by bringing in the metal strip at an angle with reference to the axis of the machine as illustrated in Fig. 7, the clasps may be punched with their axis at an angle to the metal strip, so that the metal from which each clasp is punched overlaps that from which the preceding clasp was punched. In other words, the openings formed in the strip from which the clasps are punched overlap each other as clearly shown in Fig. 7. This results in less scrap or waste of material than would be the case if the strip were fed inwardly at right angles to the transverse central vertical plane of the machine, or in other words, if the axis of the clasp punched from the strip was in line with the longitudinal axis of the strip.

While I have shown the preferred embodiment of my invention it will be understood that certain changes may be made in details of construction and in the arrangement of parts without involving a departure from the spirit and scope of my invention. Furthermore, I do not desire to be confined to a construction utilizing a strip of gummed paper as the material from which the tabs are punched or formed, as a strip of other material may be utilized, and it will be understood also that the shape of the clasp may be other than herein shown.

Having thus described my invention, what I claim is:

1. In a machine of the character described, a bed or frame having supporting means for two different portions of an envelop, means for feeding through the machine adjacent the supporting means two strips of material with plain, substantially parallel edges one for forming clasps and the other reinforcing tabs, coöperating punches and dies for making a clasp from one strip and applying the same to one portion of the envelop and in the same operation for forming a tab from the other strip and applying it to another portion of the envelop, and means for operating the feeding means for the two strips and the clasp and tab forming and applying members in predetermined relationship.

2. In a machine of the character described, a bed or frame having supporting means for two different portions of an envelop, said machine having also two slots for clasp and tab forming strips, means for intermittently feeding through said slots two strips with plain, substantially parallel edges, reciprocable punch and shearing members having paths of movement which respectively intersect the paths of movement of the two strips, and means for causing said members to form a clasp from one strip and apply it to one portion of an envelop and form a tab from the other strip and apply it to another portion of the envelop.

3. In a machine of the character described, a bed or frame, a horn on which an envelop is adapted to be supported, a base beneath the horn for the flap of the envelop, said horn and base being supported on the frame, means for feeding to the machine two strips with plain, substantially parallel edges, one in a line above the horn and one in a line above the base, and punch members for forming a clasp from one strip and for attaching it to a portion of the envelop resting on the horn and for forming a reinforcing tab from the other strip and attaching it to a portion of the flap on the base.

4. In a machine of the character described, a bed or frame, said frame supporting a horn on which an envelop is adapted to be supported and a base beneath the horn for the flap of the envelop, means for feeding to the machine two strips with plain, substantially parallel edges, one in a line above the horn and one in a line above the base, members for forming a clasp from one strip and for attaching it to a portion of the envelop resting on the horn and for forming a reinforcing tab from the other strip and attaching it to a portion of the flap on the base, and means whereby the distance between the points of attachment of the clasp and tab may be varied.

5. In a machine of the character described, a bed or frame, said bed supporting a horn on which an envelop is adapted to be supported and a base adjacent the horn for the flap of the envelop, means for feeding to the machine two strips with plain, substantially parallel edges, members for forming a clasp from one strip and for attaching it to a portion of the envelop resting on the horn and for forming a reinforcing tab from the other strip and attaching it to a portion of the flap on the base, and means adjustably securing the base to the bed whereby its position with reference to the horn may be varied.

6. In a machine of the character described, a bed or frame, a support on which an envelop is adapted to be supported, a second support adjacent the horn for the flap of the envelop, said supports being stationarily mounted on the frame, means for feeding to the machine two strips with plain, substantially parallel edges, punch and die members for forming a clasp from one strip and for attaching it to a portion of the envelop resting on the first named support and for forming a reinforcing tab from the other strip and attaching it to a portion of the flap on the second named support, and means whereby the punch and die members for forming and applying the tab may be adjusted relative to the punch and die members which form the clasp.

7. In a machine of the character described, a bed or frame, said frame supporting a horn on which an envelop is adapted to be supported and a base beneath the horn for the flap of the envelop, means for feeding to the machine two strips with plain, substantially parallel edges, one in a line above the horn and one in a line above the base, punch and die members for forming a clasp from one strip and for attaching it to a portion of the envelop resting on the horn and for forming a reinforcing tab from the other strip and attaching it to a portion of the flap on the base, and means whereby the base and punch and die members for forming and applying the tab may be adjusted relative to the horn and the punch and die members which form and apply the clasp.

8. In a machine of the character described, a bed, a support on the bed for the body of an envelop, means for supplying a strip to said machine adjacent said support, a support for the flap of the envelop, means for feeding a strip adjacent said second support, a reciprocating ram, punches carried thereby for punching clasps and reinforcing tabs from the two strips respectively and for applying the same to portions of envelops resting on said supports, a guide for the punch utilized in forming the tab, said second named support and guide being adjustably secured as a unit to said bed.

9. In a machine of the character described, a bed, a support on the bed for the body of the envelop, means for supplying a strip to said machine adjacent said support, a support for the flap of the envelop, means for feeding a strip adjacent said second support, a reciprocating ram, punches carried thereby for punching clasps and reinforcing tabs from the two strips respectively and for applying the same to portions of envelops resting on said supports, a guide for the punch utilized in forming the tab, a shear plate coöperating with the last named punch, said second named support, guide and shear plate being adjustably secured as a unit to said bed.

10. In a machine of the character described, supporting means for two portions of an envelop, guideways in the machine for two different strips, punch and die members for punching clasps from one strip and applying them to portions of envelops supported on the supporting means, and punch and die members for forming and applying tabs from the other strip and applying them to the flaps of envelops supported on the supporting means, the guideway for the strip from which the clasps are punched being at an acute angle to the major transverse dimension of the clasp punch.

11. In a machine of the character described, supporting means for two portions of an envelop, guideways in the machine for two different strips, punch and die members for punching clasps from one strip and applying them to portions of envelops supported on the supporting means, and punch and die members for forming and applying tabs from the other strip and applying them to the flaps of envelops supported on the supporting means, the guideway for the strip from which the clasps are formed extending along the front of the machine and at an acute angle to the major transverse dimension of the clasp punch, and the guideway for the strip from which the tabs are formed extending forwardly from the rear of the machine.

12. In a machine of the character described, a frame, envelop supporting means, carried by the frame, guideways for two strips, said guideways extending through portions of the machine, one adapted to receive a strip from which clasps are punched, and the other adapted to receive a strip from which reinforcing tabs are punched, means for forming clasps and tabs from the strips and for applying them to envelops, means for feeding the strip from which the clasps are punched, said means including a pair of rollers located beyond the guideway for said strip and adapted to receive the punched strip between them and pull it through the machine, and means for intermittently rotating said rollers.

13. In a machine of the character described, envelop supporting means, guideways for two strips, said guideways extending through portions of the machine, one adapted to receive a strip from which clasps are punched and the other to receive a strip from which reinforcing tabs are punched, means for forming clasps and tabs and for applying them to envelops, and means for feeding both strips, the feeding means for one strip adapted to pull the strip through the guideway and engaging said strip beyond the punching point and the feeding means for the other strip adapted to push the strip into the guideway.

14. In a machine of the character described, envelop supporting means, guideways for two different strips, said guideways extending through portions of the machine, one adapted to receive a strip from which clasps are punched and the other to receive the other strip from which reinforcing tabs are punched, means for forming and applying the clasps and tabs, means for feeding the strip from which the tabs are formed, comprising a roller over which the strip is adapted to pass, a pawl for pressing the strip down onto said roller and for moving the strip and roller forwardly, means for intermittently operating the pawl, and means for feeding the strip from which the clasps are punched.

In testimony whereof, I hereunto affix my signature.

HARRY F. AFFELDER.